(12) United States Patent
Kim et al.

(10) Patent No.: US 9,031,037 B2
(45) Date of Patent: May 12, 2015

(54) METHOD AND APPARATUS FOR REDUCING LOSS OF MEDIA DATA WHILE HANDOVER IS PERFORMED

(75) Inventors: Soung-kwan Kim, Osan-si (KR); Ji-youn Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1126 days.

(21) Appl. No.: 12/941,260

(22) Filed: Nov. 8, 2010

(65) Prior Publication Data

US 2011/0110330 A1    May 12, 2011

(30) Foreign Application Priority Data

Nov. 12, 2009    (KR) .................. 10-2009-0109178

(51) Int. Cl.
| | |
|---|---|
| *H04W 4/00* | (2009.01) |
| *H04W 36/02* | (2009.01) |
| *H04N 21/442* | (2011.01) |
| *H04N 21/414* | (2011.01) |

(52) U.S. Cl.
CPC ......... *H04W 36/02* (2013.01); *H04N 21/44209* (2013.01); *H04N 21/41407* (2013.01)

(58) Field of Classification Search
CPC .............................. H04W 36/02; H04W 80/04
USPC ......................................................... 370/331
See application file for complete search history.

(56) References Cited

U.S. PATENT DOCUMENTS

| | | | |
|---|---|---|---|
| 7,742,453 B1 * | 6/2010 | Goyal et al. ................... | 370/331 |
| 2006/0077994 A1 | 4/2006 | Spindola et al. | |
| 2009/0190554 A1 | 7/2009 | Cho | |
| 2009/0323632 A1 * | 12/2009 | Nix ............................... | 370/331 |
| 2010/0027503 A1 * | 2/2010 | Eravelli et al. ................. | 370/331 |

FOREIGN PATENT DOCUMENTS

| | | |
|---|---|---|
| WO | 2007130012 A1 | 11/2007 |
| WO | 2009107587 A1 | 9/2009 |

OTHER PUBLICATIONS

Communication dated Jul. 2, 2014 issued by the European Patent Office in counterpart European Patent Application No. 10190878.8.

* cited by examiner

*Primary Examiner* — Shripal Khajuria
(74) *Attorney, Agent, or Firm* — Sughrue Mion, PLLC

(57) ABSTRACT

A method of reducing an amount of media data lost when a next handover is performed, wherein the method is performed by a first terminal for transmitting and receiving the media data to and from a second terminal, the method including: predicting an amount of the media data that may be lost when the next handover is performed; generating control information for reducing the amount of the media data lost when the next handover is performed by using the predicted amount of the media data lost when the next handover is performed; and reducing the amount of the media data lost when the next handover is performed by using the generated control information while the next handover is performed.

35 Claims, 4 Drawing Sheets

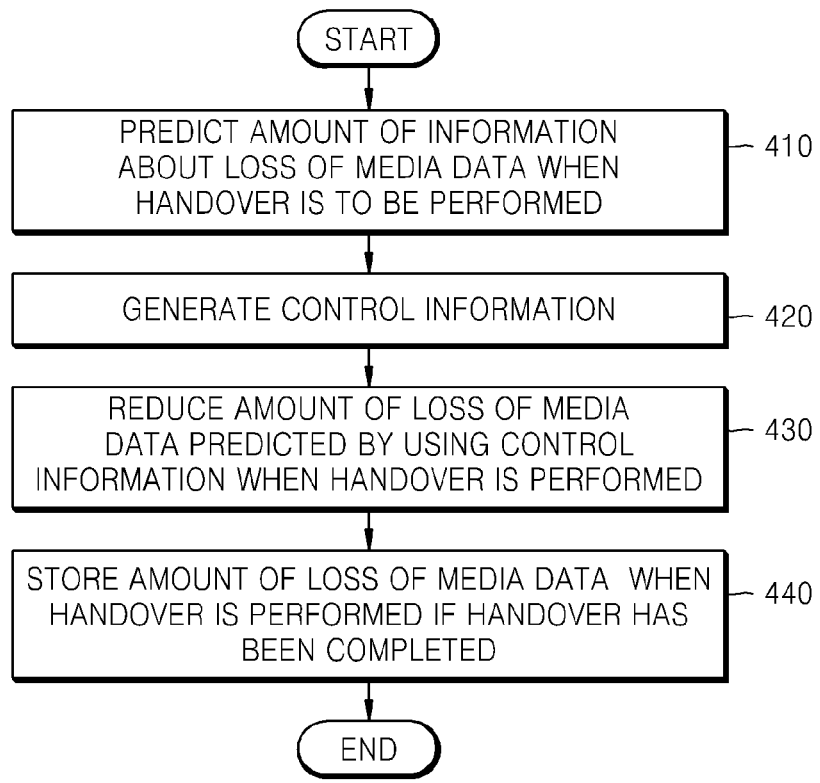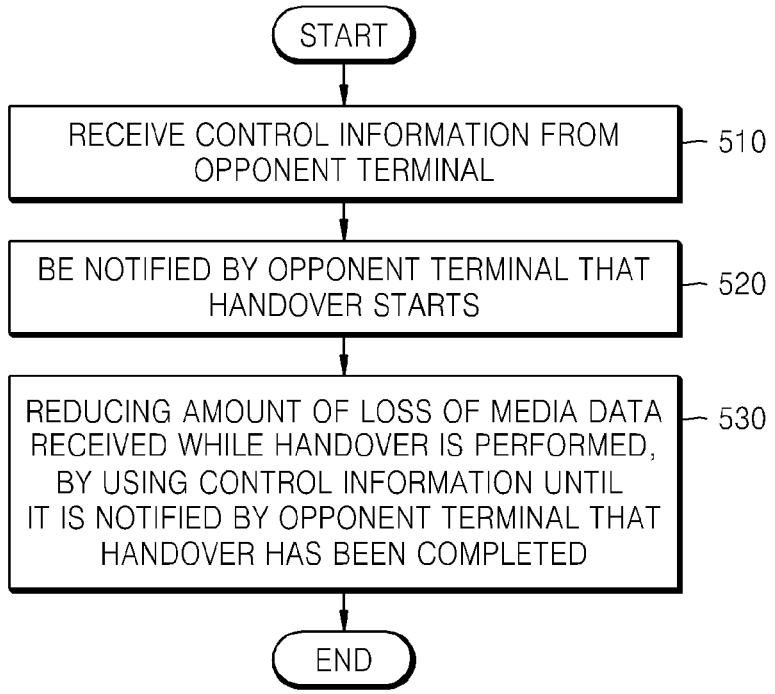

METHOD AND APPARATUS FOR REDUCING LOSS OF MEDIA DATA WHILE HANDOVER IS PERFORMED

CROSS-REFERENCE TO RELATED PATENT APPLICATION

This application claims the benefit of Korean Patent Application No. 10-2009-0109178, filed on Nov. 12, 2009 in the Korean Intellectual Property Office, the disclosure of which is incorporated herein in its entirety by reference.

BACKGROUND

1. Field

The exemplary embodiments relate to a method and apparatus for reducing a loss of media data, and more particularly, to a method and apparatus for reducing a loss of media data by which information about a loss of media data during a handover is previously predicted by using information about a loss of media data of a past handover and the loss of media data is prevented by using the previously-predicted information so that the loss of media data does not occur during the handover and lowering of quality of media data is prevented.

2. Description of the Related Art

With the development of communications technology, multimedia data, such as video or audio data, can be transmitted and received to and from other terminals in real-time by using a mobile terminal. When the multimedia data is transmitted to a receiving terminal via a communication network in real-time, the mobile terminal transmits the multimedia data to the receiving terminal at predetermined time intervals, i.e., at each packet time. When the mobile terminal crosses a cell boundary into an adjacent cell, a handover may be performed so that the mobile terminal may continue transmitting the multimedia data to a receiving terminal in the adjacent cell. However, during the handover, jitter may occur in packets or a loss of packets may occur until a base station in the adjacent cell is tuned to a new channel, and thus the quality of video or audio data is lowered.

SUMMARY

The exemplary embodiments provide a method and apparatus for reducing a loss of media data by which a loss of media data does not occur during a handover due to jitter or a loss of packets.

According to an aspect of an exemplary embodiment, there is provided a method of reducing an amount of media data lost when a handover is performed, wherein the method is performed by a first terminal for transmitting or receiving the media data to or from a second terminal, the method including: predicting an amount of the media data that may be lost when the handover is performed; generating control information for reducing the amount of the media data lost when the handover is performed by using the predicted amount of the media data that may be lost when the handover is performed; and reducing the amount of the media data lost when the handover is performed by using the control information while the handover is performed.

The method may further include: transmitting the control information to the second terminal; and notifying the second terminal that the handover is to be performed.

The predicting the amount of the media data that may be lost when the handover is performed may include predicting the amount of the media data that may be lost when the handover is performed by using information about an amount of media data lost during a past handover.

The predicting the amount of the media data that may be lost when the handover is performed may include predicting at least one of an amount of packet loss, a jitter value, and a time skew value while the handover is performed.

If the predicting of the amount of the media data that may be lost when the handover is performed includes predicting the amount of the packet loss, the reducing the amount of the media data lost when the handover is performed may include: selecting an algorithm for recovering the packet loss according to the predicted amount of packet loss by using the control information; and recovering the packet loss by using the selected algorithm for recovering the packet loss.

If the predicting the amount of the media data that may be lost when the handover is performed includes predicting the jitter value, the reducing the amount of the media data lost when the handover is performed may include expanding a size of a jitter buffer of the first terminal by using the control information.

The method may further include transmitting data for performing forward error correction on the media data to the second terminal while the handover is performed.

The method may further include generating a channel for transmitting the data for performing the forward error correction when a connection is set up with the second terminal, wherein the transmitting the data for performing the forward error correction on the media data includes transmitting the data for performing the forward error correction to the second terminal by using the channel.

The method may further include, if the handover has been completed, notifying the second terminal that the handover has been completed.

The method may further include, if the handover has been completed, storing an amount of the media data lost during the handover.

According to an aspect of another exemplary embodiment, there is provided a method of reducing an amount of media data lost when a handover is performed, wherein the method is performed by a first terminal for transmitting or receiving the media data to or from a second terminal, the method including: receiving, from the second terminal, control information for reducing the amount of the media data lost when the handover is performed; receiving notification, from the second terminal, that the handover is to be performed; and reducing the amount of the media data lost when the handover is performed by using the control information.

The method may further include: receiving notification, from the second terminal, that the handover has been completed; and terminating the reducing the amount of the media data lost when the handover is performed by using the control information.

The control information may be generated by using the amount of the media data lost when a past handover is performed, and the amount of the media data lost when the handover is performed may include information about at least one of a predicted amount of packet loss, a predicted jitter value, and a predicted time skew value while the handover is performed.

If the amount of the media data lost when the handover is performed includes the predicted amount of the packet loss, the reducing the amount of the media data lost when the handover is performed may include: selecting a predetermined algorithm for recovering the packet loss according to the predicted amount of the packet loss by using the control information; and recovering the packet loss by using the selected algorithm for recovering the packet loss.

If the amount of the media data lost when the handover is performed includes the predicted jitter value, the reducing the amount of the media data lost when the handover is performed may include expanding a size of a jitter buffer of the first terminal by using the control information.

The method may further include: receiving, from the second terminal, data for performing forward error correction on the media data; and performing the forward error correction on the media data by using the data for performing the forward error correction.

The method may further include: receiving, from the second terminal, notification that the handover has been completed; and terminating the performing the forward error correction on the media data in response to the received notification.

According to an aspect of another exemplary embodiment, there is provided a first terminal for transmitting or receiving media data to or from a second terminal when a handover is performed, the first terminal including: a communication unit which transmits or receives the media data to or from the second terminal; a prediction data processing unit which predicts an amount of the media data that may be lost when the handover is performed and which generates control information for reducing the amount of the media data lost when the handover is performed by using the predicted amount of the media data that may be lost when the handover is performed; and a controller which reduces the amount of the media data lost when the handover is performed by using the control information while the handover is performed.

According to an aspect of still another exemplary embodiment, there is provided a first terminal for transmitting or receiving media data to or from a second terminal when a handover is performed, the first terminal including: a communication unit which transmits or receives the media data to or from the second terminal, which receives, from the second terminal, control information that is generated by using a predicted amount of the media data that may be lost when the handover is performed, and which receives, from the second terminal, notification that the handover is to be performed; and a controller which reduces the amount of the media data lost when the handover is performed by using the control information.

According to an aspect of yet another exemplary embodiment, there is provided a computer readable recording medium having recorded thereon a program for executing, by a first terminal receiving media data from a second terminal during a handover, a method of reducing an amount of the media data lost when the handover is performed, wherein the method includes: predicting an amount of the media data that may be lost when the handover is performed; generating control information for reducing the amount of the media data lost when the handover is performed by using the predicted amount of the media data that may be lost when the handover is performed; and reducing the amount of media data lost when the handover is performed by using the control information while the handover is performed.

According to an aspect of another exemplary embodiment, there is provided a computer readable recording medium having recorded thereon a program for executing, by a first terminal receiving media data from a second terminal during a handover, a method of reducing an amount of the media data lost when the handover is performed, wherein the method includes: receiving, from the second terminal, control information for reducing the amount of the media data lost when the handover is performed; receiving notification, from the second terminal, that the handover is to be performed; and reducing the amount of the media data lost when the handover is performed by using the control information.

According to an aspect of yet another exemplary embodiment, there is provided a system for reducing an amount of media data lost when a handover is performed, the system including: a first terminal receiving the media data, the first terminal including: a communication unit which receives the media data, a prediction data processing unit which predicts an amount of the media data that may be lost when the handover is performed and which generates control information for reducing the amount of the media data lost when the handover is performed by using the predicted amount of the media data that may be lost when the handover is performed, and a controller which reduces the amount of the media data lost when the handover is performed by using the control information while the handover is performed; and a second terminal transmitting the media data.

According to an aspect of another exemplary embodiment, there is provided a system for reducing an amount of media data lost when a handover is performed, the system including: a second terminal transmitting the media data, the second terminal including: a second controller which predicts the amount of the media data that may be lost when then handover is performed, and which generates control information by using the predicted amount of the media data that may be lost when the handover is performed, and a second communication unit which transmits the control information, which transmits the media data, and which transmits notification that the handover is to be performed when the handover is to be performed; and a first terminal receiving the media data, the first terminal including: a first communication unit which receives the media data from the second terminal, which receives, from the second terminal, the control information, and which receives the notification, from the second terminal, that the handover is to be performed; and a first controller which reduces the amount of the media data lost when the handover is performed by using the control information.

BRIEF DESCRIPTION OF THE DRAWINGS

The above and other features and advantages will become more apparent by describing in detail exemplary embodiments thereof with reference to the attached drawings in which:

FIG. 4 is a flowchart illustrating a method of reducing a loss of media data according to an exemplary embodiment; and FIG. 5 is a flowchart illustrating a method of reducing a loss of media data according to another exemplary embodiment.

DETAILED DESCRIPTION OF THE EXEMPLARY EMBODIMENTS

The exemplary embodiments will now be described more fully with reference to the accompanying drawings so as to be easily realized by a person having ordinary knowledge in the art. The exemplary embodiments may be embodied in various forms without being limited to the exemplary embodiments set forth herein. It is understood that expressions such as "at least one of," when preceding a list of elements, modify the entire list of elements and do not modify the individual elements of the list.

Figure 1:
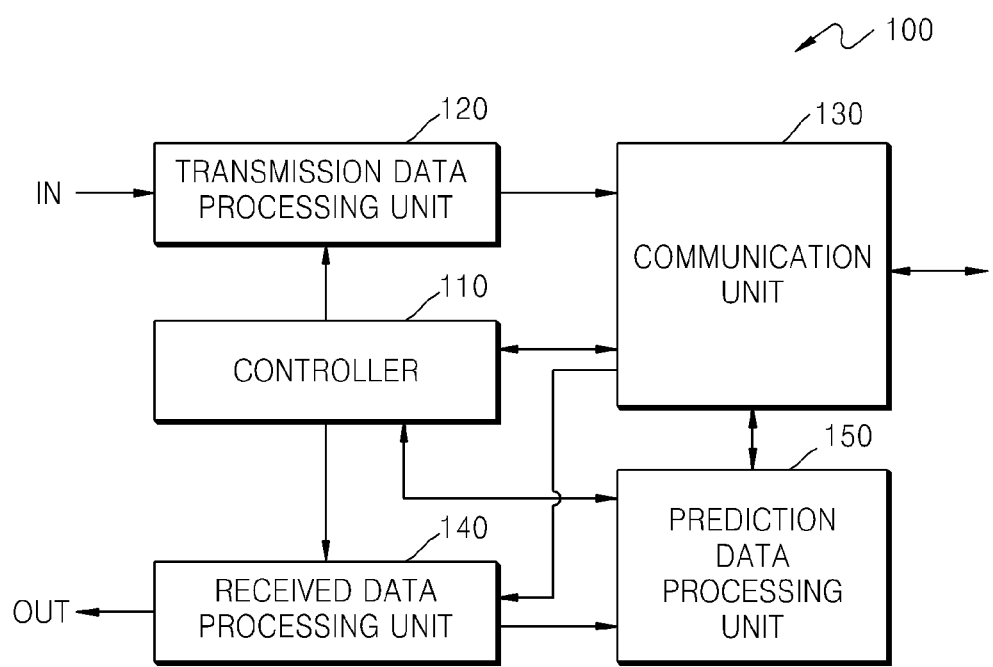
FIG. 1 is a block diagram of a user terminal according to an exemplary embodiment.

FIG. 1 is a block diagram of a user terminal 100 according to an exemplary embodiment. Referring to FIG. 1, the user terminal 100 includes a controller 110, a transmission data processing unit 120, a communication unit 130, a received data processing unit 140, and a prediction data processing unit 150.

The user terminal 100 is a digital device that performs communication with an opponent terminal (not shown) via at least one of a wired and wireless communication network and transmits at least one of audio and video data in real-time. The user terminal 100 and the opponent terminal may include a head set including a communication module, a personal data assistant (PDA), a portable multimedia player (PMP), a mobile phone, a navigation device, a personal computer (PC) or a notebook computer including an ultra mobile PC (UMPC).

According to the exemplary embodiments, data that is transmitted and received by the user terminal 100 to and from the opponent terminal may include either or both audio data and video data. Hereinafter, multimedia data that is transmitted and received by the user terminal 100 to and from the opponent terminal is referred to as media data.

The transmission data processing unit 120 encodes media data and performs signal processing on the encoded media data in a format in which the encoded media data may be transmitted to the opponent terminal.

The communication unit 130 transmits and receives the media data to and from the opponent terminal via a communication network. Also, the communication unit 130 determines whether the user terminal 100 enters a handover region, and notifies the controller 110 that the user terminal 100 has entered the handover region if so determined.

The received data processing unit 140 decodes the media data that is received from the opponent terminal and performs signal processing to compensate for a loss of packets on the decoded media data in a format in which the user terminal 100 uses the media data.

The received data processing unit 140 includes a jitter buffer (not shown). The jitter buffer temporarily stores the data received by the communication unit 130. When intervals between received packets are regular, the data may be temporarily stored using the jitter buffer, which has a predetermined size. However, when intervals between received packets are varied during a handover and jitter occurs, a loss of the media data may occur. In other words, when the media data is transmitted and received during a handover, jitter may occur or packets may be lost, and thus the reproduction quality of the media data, such as video or audio data, may be lowered. Also, packets to be received at a predetermined time may be received before or after the predetermined time and thus time skew may occur. In an exemplary embodiment, jitter or a loss of packets that may occur during a handover may be previously predicted before the handover is performed, and control information for preventing a predicted loss may be generated. Accordingly, by using the control information, a loss of media data during the handover may be prevented and the quality of the media data may be prevented from being lowered.

To this end, the prediction data processing unit 150 predicts an amount of media data that may be lost when a handover is performed, by using information about an amount of media data lost during a past handover. In an exemplary embodiment, the information about an amount of media data lost during a past handover is information that may be used to affect the predicted amount of media data that may be lost when a handover is performed. As described above, when jitter or a loss of packets occurs, time skew or the like occurs, and thus an amount of media data that is transmitted and received to and from the opponent terminal may be lost. The prediction data processing unit 150 predicts the amount of media data that may be lost when a handover is performed, by using the information about an amount of media data lost during a past handover. The prediction data processing unit 150 may predict an amount of packets that may be lost when a handover is performed by using information about an amount of packets lost during a past handover or information about amounts of packets lost during a plurality of past handovers, or may predict a jitter value or a time skew value corresponding to when a handover is performed by using information about a jitter value or a time skew value that was obtained for a past handover or jitter values or time skew values that were obtained for the plurality of past handovers.

When a jitter value is J, an amount corresponding to packet loss is L, and a time skew value is S, the predicted amount of media data that may be lost when a handover is performed at time n, which is predicted by the prediction data processing unit 150 according to a prediction function W using information about amounts of media data lost during k past handovers, may be obtained using Equation 1:

$$Jp(n) = \Sigma W_J(i) J(n-i), \text{ where } i=1 \ldots k$$

$$Lp(n) = \Sigma W_L(i) L(n-i), \text{ where } i=1 \ldots k$$

$$Sp(n) = \Sigma W_S(i) S(n-i), \text{ where } i=1 \ldots k \quad (1)$$

The prediction data processing unit 150 predicts the amount of media data that may be lost when a handover is performed and generates control information for reducing the predicted amount of media data that may be lost when the handover is performed by using the predicted amount of media data that may be lost when the handover is performed. When the prediction data processing unit 150 predicts a jitter value corresponding to when a next handover is performed, the prediction data processing unit 150 may generate control information for expanding the size of the jitter buffer included in the received data processing unit 140 for when the next handover is started.

As another example, when the prediction data processing unit 150 predicts the amount of packets that may be lost when a handover is performed, the prediction data processing unit 150 may generate information for selecting a method to recover packets that may be lost by using the received data processing unit 140, i.e., an algorithm for recovering packets that may be lost, according to a packet loss rate or the predicted amount of packets that may be lost when the next handover is performed.

Algorithms for recovering packets that may be lost are different according to load on a central processing unit (CPU), sound quality, or image quality. A program used to drive each algorithm for recovering packets that may be lost is stored in a memory unit (not shown) in the user terminal 100. In addition to the program used to drive the algorithms for recovering packets that may be lost, a program that is used by the user terminal 100 to perform communication with the opponent terminal may also be stored in the memory unit.

When the predicted amount of packets that may be lost when a handover is performed is greater than a predetermined amount, the prediction data processing unit 150 may select an algorithm that recovers a greater amount of packets that may be lost. Conversely, when the predicted amount of packets that may be lost when a handover is performed is less than the predetermined amount, the prediction data processing unit 150 may generate control information for selecting an algorithm in which the load on the CPU is small.

When the media data is audio data, an algorithm for recovering packets of the audio data that may be lost may be double sided pitch waveform replication (DSPWR), waveform similarity overlap-add (WSOLA), modified WSOLA, time-proportion based pitch-waveform interpolation (TPBPWI) or non-linear oscillator model (NOM).

The prediction data processing unit 150 generates control information for selecting a predetermined algorithm for recovering packets that may be lost according to the packet loss rate or the predicted amount of packets that may be lost when a next handover is performed and transmits the control information to the controller 110 and the communication unit 130.

When a handover has been completed, the prediction data processing unit 150 calculates an amount of media data that was lost during the handover, stores the calculated amount, and predicts the amount of media data that may be lost when a next handover is performed.

The controller 110 may control the user terminal 100 to perform a method of reducing the amount of media data that may be lost when a handover is performed. The controller 110 includes an arithmetic logic unit (ALU) for performing calculation and a register for temporarily storing data and commands. While not required in another exemplary embodiment, the controller 160 may include an additional hardware component (such as a processor or microprocessor) executing a computer program stored in a computer-readable medium.

The controller 110 reduces the predicted amount of media data that may be lost when a handover is performed by using the control information received from the prediction data processing unit 150, thereby improving the quality of the media data that is received from the opponent terminal. Improvements in the quality of the media data refers to the media data, such as audio or video data, being better sent so that, for example, a mosaic phenomenon does not occur in video media data. When the control information is information for selecting the algorithm for recovering packets that may be lost according to the predicted amount of packets that may be lost when a handover is performed, the controller 110 selects a predetermined algorithm for recovering packets that may be lost according to the predicted amount of packets that may be lost when a handover is performed by using the control information, extracts the program for driving the selected algorithm for recovering packets that may be lost, and recovers packets that may be lost by using the extracted program.

When the control information is information about expansion of the size of the jitter buffer according to the jitter value, the controller 110 expands the size of the jitter buffer of the user terminal 100 for a handover so that a packet loss may not occur.

The communication unit 130 transmits the control information received from the prediction data processing unit 150 to the opponent terminal via a communication terminal. Also, the communication unit 130 determines whether the user terminal 100 enters a handover region, and notifies the opponent terminal that the user terminal 100 has entered a handover region if so determined. When a handover has been completed, the communication unit 130 notifies the opponent terminal that the handover has been completed.

As described above, the user terminal 100 may predict the amount of media data that may be lost when a next handover is performed, by using the information about the amount of media data lost during a past handover, and may generate the control information by using the predicted amount of media data that may be lost when a handover is performed. Accordingly, the user terminal 100 according to an exemplary embodiment reduces the predicted amount of media data that may be lost when a next handover is performed.

After being notified that a handover is to be performed by the user terminal 100, the opponent terminal may reduce the predicted amount of media data that may be lost when a handover is performed by using the control information that is received from the user terminal 100. The opponent terminal reduces the predicted amount of media data that may be lost when a handover is performed by using the control information until it is notified by the user terminal 100 that the handover has been completed, so that a loss of transmitted or received data during the handover may be reduced.

According to another exemplary embodiment, the user terminal 100 may also perform the function described above with respect to the opponent terminal. In detail, the user terminal 100 may receive control information from the opponent terminal. Also, when the opponent terminal enters a handover region, the user terminal 100 is notified by the opponent terminal that a handover is to be performed. The user terminal 100 expands the size of the jitter buffer thereof according to the control information that is received from the opponent terminal for when the handover is started, or selects other algorithms for recovering packets that may be lost, so that packets that may be lost may be recovered and a loss of media data may be prevented.

Figure 2:
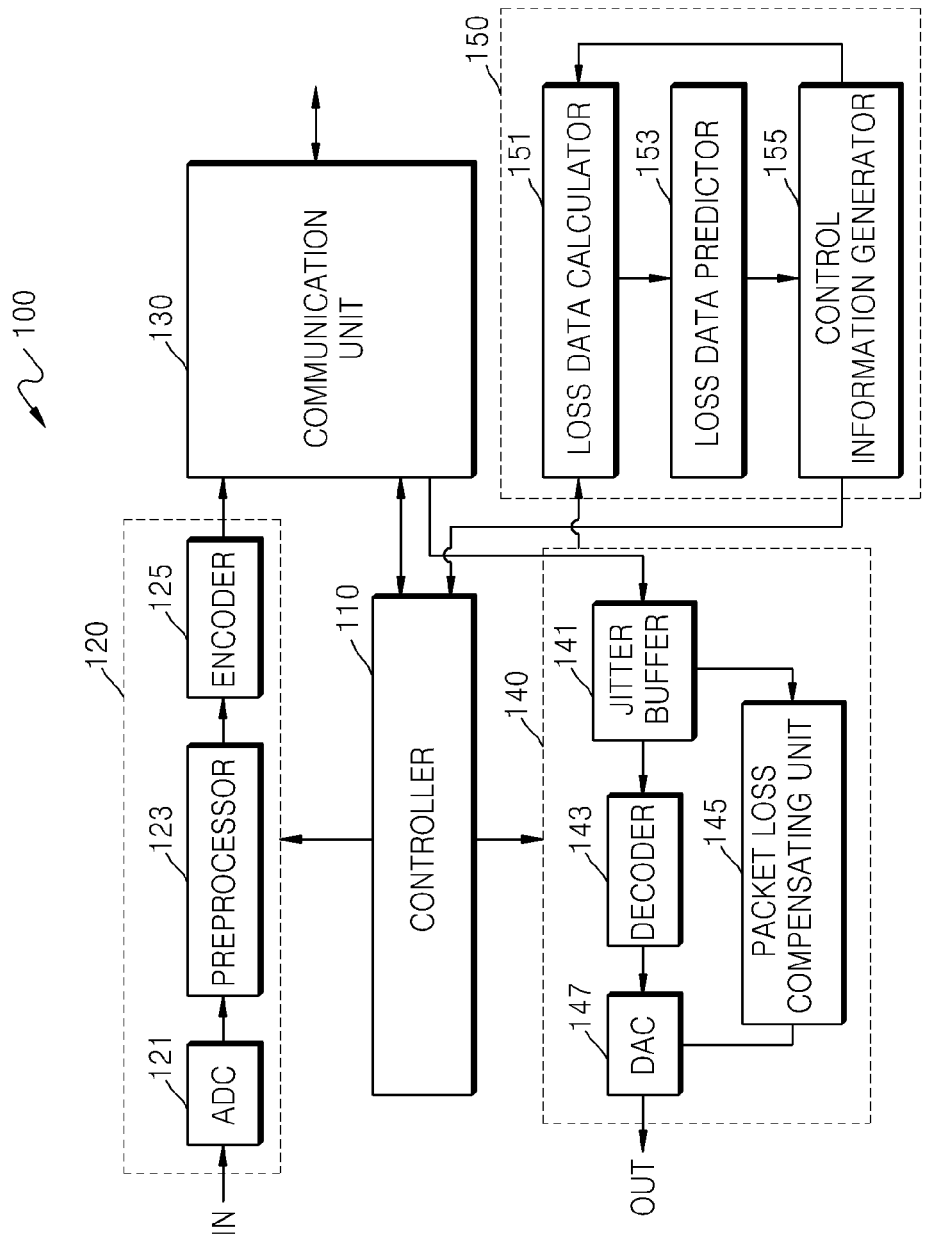
FIG. 2 is a detailed block diagram of the user terminal of FIG. 1.

FIG. 2 is a detailed block diagram of the user terminal 100 of FIG. 1. Referring to FIG. 2, the user terminal 100 according to the present exemplary embodiment includes the controller 110, the transmission data processing unit 120, the communication unit 130, the received data processing unit 140, and the prediction data processing unit 150. Redundant descriptions of the elements described in FIG. 1 among the elements of the user terminal 100 of FIG. 2 will not be repeated herein.

The transmission data processing unit 120 includes an analog to digital converter (ADC) 121, a preprocessor 123, and an encoder 125. The ADC 121 converts an analog signal input to the user terminal 100 into a digital signal. When the analog signal input to the user terminal 100 is an audio signal, the preprocessor 123 removes noise that may occur in the digital signal generated by the ADC 121, by using an echo canceller, and controls a gain thereof by using an automatic gain controller (AGC). The encoder 125 encodes a signal that is processed by the preprocessor 123 and transmits the encoded data to the communication unit 130.

The communication unit 130 transmits the media data to an opponent terminal (not shown).

The received data processing unit 140 includes a jitter buffer 141, a decoder 143, a packet loss compensation unit 145, and a digital to analog converter (DAC) 147.

The jitter buffer 141 temporarily stores packets that are received via the communication unit 130.

The decoder 143 decodes packets stored in the jitter buffer 141 and transmits the decoded packets to the DAC 147.

The packet loss compensating unit 145 recovers packets that may be lost. In the present exemplary embodiment, the packet loss compensating unit 145 may compensate for packets that may be lost by using any of various algorithms, and packets that may be lost may be compensated for according to an algorithm that is determined by the control information that is generated by the user terminal 100 or received from the opponent terminal.

The DAC 147 converts the packets that are decoded by the decoder 143 or recovered by the packet loss compensating unit 145 into an analog signal.

The prediction data processing unit 150 includes a loss data calculator 151, a loss data predictor 153, and a control information generator 155. As described above, while a handover is performed, the packets of media data that are received from the opponent terminal may be lost, jitter may occur in the packets, or time skew may occur. The loss data calculator 151 calculates information about the amount of media data that was lost during a past handover and stores the calculated amount of the information.

The loss data predictor 153 predicts the amount of media data that may be lost when a next handover is performed, by using the calculated information about the amount of media data that was lost during a past handover stored in the loss data calculator 151. The loss data predictor 153 may predict the amount of media data that may be lost when a next handover is performed by using a linear function.

The control information generator 155 generates control information by using the predicted amount of media data that may be lost when a next handover is performed predicted by the loss data predictor 153. The control information generator 155 may generate the control information for selecting an algorithm for recovering packets that may be lost to be used by the packet loss compensating unit 145, according to the predicted packet loss rate, or may generate the control information for expanding the size of the jitter buffer 141 according to the predicted jitter value. The control information generator 155 transmits the generated control information to the controller 110 and to the opponent terminal via the communication unit 130.

While the handover is performed, the control information may be simultaneously transmitted to the opponent terminal with notification to the opponent terminal that the handover has started being performed, or the control information may be previously transmitted to the opponent terminal before notifying the opponent terminal that the handover has started being performed.

The controller 110 reduces the predicted amount of media data received from the opponent terminal that may be lost when a handover is performed by using the control information generated by the prediction data processing unit 150. In detail, when recognizing that a handover is to be performed, the controller 110 expands the size of the jitter buffer 141 to a size corresponding to the predicted jitter value, or compensates for the predicted amount of packets that may be lost when a handover is performed, according to one or more algorithms other than the algorithm for compensating for packets that may be lost that was performed before a handover.

The control information may be generated by the user terminal 100 or may be transmitted from the opponent terminal. In other words, when the opponent terminal performs a handover, the opponent terminal may generate the control information by using the predicted amount of media data that may be lost when a handover is performed, may reduce the amount of media data that is input to the opponent terminal that may be lost by using the generated control information, and may transmit the control information to the user terminal 100. When the opponent terminal notifies the user terminal 100 that a handover is to be performed, the user terminal 100 reduces the amount of media data loss among data received from the opponent terminal by using the control information that is received from the opponent terminal. When notified by the opponent terminal that the handover has been completed, the user terminal 100 stops performing the method of reducing the predicted amount of media data loss. In other words, if the handover has been completed, the controller 110 controls the user terminal 100 to return to an original controlled state before the handover was performed.

The user terminal 100 and the opponent terminal may perform a handover simultaneously according to circumstances. In detail, when both the user terminal 100 and the opponent terminal enter respective handover regions, the user terminal 100 generates the control information for reducing the amount of media data loss that is input to the user terminal 100 and the opponent terminal generates the control information for reducing the amount of media data loss that is input to the opponent terminal.

Each of the user terminal 100 and the opponent terminal transmits respective control information to each other. In this case, the user terminal 100 reduces the amount of media data loss by using both the control information generated by the user terminal 100 and the control information received from the opponent terminal. In detail, while a handover is performed, the user terminal 100 expands the size of the jitter buffer 141 of the user terminal 100 to a size that is obtained by adding the size of the jitter buffer 141 corresponding to the control information received from the opponent terminal to the size of the jitter buffer 141 corresponding to the control information generated by the user terminal 100. Alternatively, while the handover is performed, the user terminal 100 obtains a packet loss rate by using the control information generated by the user terminal 100 and the control information received from the opponent terminal and selects an algorithm for recovering packets that may be lost that is suitable for the obtained packet loss rate. The user terminal 100 recovers packets that may be lost by using the selected algorithm for recovering packets that may be lost.

Figure 3:
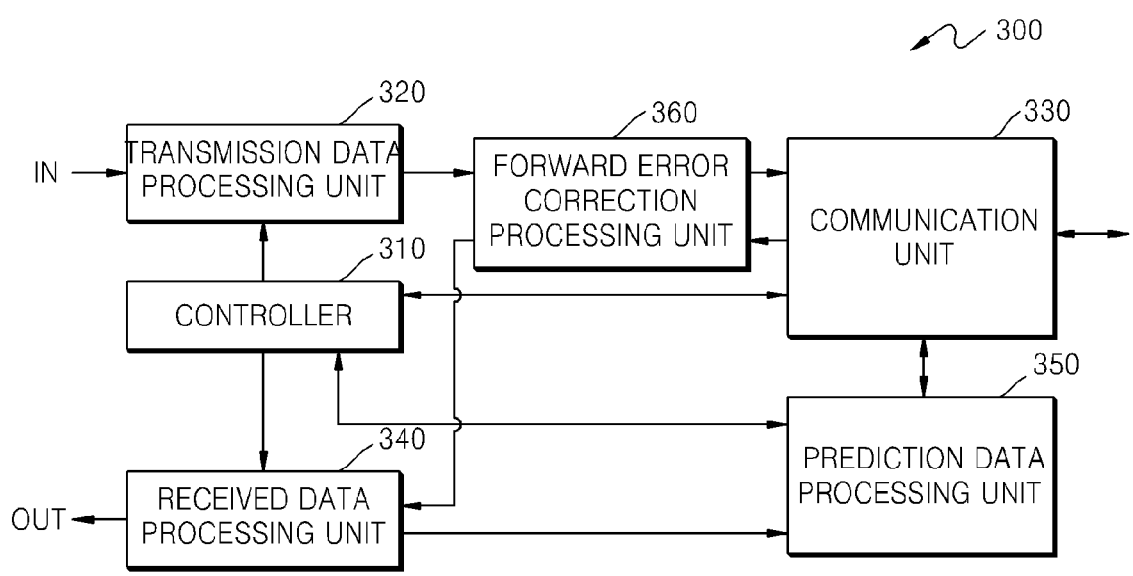
FIG. 3 is a block diagram of a user terminal according to another exemplary embodiment.

FIG. 3 is a block diagram of a user terminal 300 according to another exemplary embodiment. Referring to FIG. 3, the user terminal 300 includes a controller 310, a transmission data processing unit 320, a communication unit 330, a received data processing unit 340, a prediction data processing unit 350, and a forward error correction processing unit 360. The user terminal 300 of FIG. 3 further includes the forward error correction processing unit 360 as well as the elements of the user terminal 100 of FIG. 1. Redundant descriptions of the elements described in FIG. 1 among the elements of the user terminal 300 of FIG. 3 will not be repeated herein.

The forward error correction processing unit 360 generates redundancy data for performing forward error correction on the media data that is processed by the transmission data processing unit 320. The generated redundancy data is to correct errors of the media data to be transmitted to the opponent terminal that may occur during a handover. The forward error correction processing unit 360 generates the redundancy data for performing the forward error correction on the media data via the communication unit 330 from the time at which the handover is started until the handover has been completed, and the communication unit 330 transmits the data for performing the forward error correction on the media data to the opponent terminal.

The communication unit 330 generates a channel for transmitting the data for performing the forward error correction on the media data when a call is set up with the opponent terminal, i.e., when telephone or wireless connection starts, separately from a channel for transmitting audio or video data. The communication unit 330 transmits the redundancy that is generated by the forward error correction processing unit 360 while a handover is performed to the opponent terminal by using a separate channel from the channel for transmitting audio and/or video data.

The opponent terminal receives the data for performing the forward error correction on the media data from the user terminal 300 and corrects errors of the media data that is received from the user terminal 300 by using the data for performing the forward error correction on the media data.

If a handover has been completed, the forward error correction processing unit 360 terminates generating of the data for performing the forward error correction on the media data.

When the opponent terminal includes the elements of FIG. 3, if the opponent terminal enters a handover region, the opponent terminal transmits the data for performing the forward error correction on the media data as well as the media data to the user terminal 300. In this case, the forward error correction processing unit 360 of the user terminal 300 performs error correction on the media data that is received from the opponent terminal by using the data for performing the forward error correction on the media data and transmits the error-corrected media data to the received data processing unit 340.

In this way, according to the current exemplary embodiment, while a handover is performed, the redundancy data for performing forward error correction on the data to be transmitted is transmitted to the opponent terminal so that the errors of the media data to be transmitted and received to and from the opponent terminal may be reduced.

FIG. 4 is a flowchart illustrating a method of reducing the amount of media data that may be lost during a handover according to an exemplary embodiment, with reference to the user terminal 100 or 300 of FIG. 1 or 3. Referring to FIG. 4, in Operation 410, the user terminal 100 or 300 predicts the amount of media data that may be lost during a handover by using information about the amount of information that was lost during a past handover. In Operation 420, the user terminal 100 or 300 generates control information by using the predicted amount of media data that may be lost during a handover.

When the user terminal 100 or 300 enters a handover region, the user terminal 100 or 300 reduces the predicted amount of media data that may be lost when a handover is performed by using the generated control information in Operation 430. In detail, the user terminal 100 or 300 expands the size of the jitter buffer 141 according to the generated control information when performing signal processing on the input media data, or selects an algorithm for recovering packets that may be lost and recovers packets that may be lost by using the selected algorithm, thereby reducing the predicted amount of media data that may be lost when a handover is performed. In Operation 440, if the handover has been completed, the user terminal 100 or 300 stores the amount of media data that was lost during the handover, i.e., information about at least one selected from the group consisting of a jitter value, an amount of packet loss, and a time skew value during the handover.

When the forward error correction processing unit 360 is included in the user terminal 300, as illustrated in FIG. 3, the user terminal 300 generates a forward error correction processing data for the media data to be transmitted and transmits the generated forward error correction processing data to the opponent terminal while the handover is performed.

FIG. 5 is a flowchart illustrating a method of reducing an amount of media data that may be lost according to another exemplary embodiment. Referring to FIG. 5, in Operation 510, the opponent terminal generates control information for reducing the predicted amount of media data that may be lost when a handover is performed, and transmits the generated control information to the user terminal 100 or 300.

In Operation 520, when the opponent terminal enters a handover region, the opponent terminal notifies the user terminal 100 or 300 that the opponent terminal has entered the handover region. The opponent terminal may simultaneously transmit the generated control information to the user terminal 100 or 300 and notify the user terminal 100 or 300 that the opponent terminal has entered the handover region. However, it is understood that another exemplary embodiment is not limited thereto. For example, the opponent terminal may previously transmit the generated control information to the user terminal 100 or 300 before notifying the user terminal 100 or 300 that the opponent terminal has entered the handover region.

In Operation 530, the user terminal 100 or 300 adjusts the size of the jitter buffer 141 of the user terminal 100 or 300 by using the control information received from the opponent terminal or changes an algorithm for recovering packets that may be lost, thereby reducing the predicted amount of media data that may be lost when the handover is performed.

After being notified by the opponent terminal that the handover has been completed, the user terminal 100 or 300 returns the size of the jitter buffer 141 back to its original size and recovers packets that may be lost by using the algorithm for recovering packets that may be lost.

When the opponent terminal transmits forward error correction data for the media data to the user terminal 300 while a handover is performed, the user terminal 300 corrects errors of the media data that is received from the opponent terminal by using the forward error correction data and performs signal processing on the error-corrected media data.

As described above, in a method and apparatus for reducing an amount of media data that may be lost when a handover is performed according to the exemplary embodiments, the amount of media data that may be lost when a handover is performed is previously predicted, and control information for reducing the predicted amount of media data that may be lost when the handover is performed is generated using the predicted amount of media data that may be lost during the handover. Accordingly, the predicted amount of media data that may be lost during the handover during handover can be reduced and, thus, the quality of media data can be improved.

While not restricted thereto, the exemplary embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the exemplary embodiments can be easily construed by programmers skilled in the art to which the present invention pertains.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the exemplary embodiments, but by the appended claims, and all differences within the scope will be construed as being included in the present invention.

What is claimed is:
1. A method of reducing an amount of media data to be lost when a handover is performed, wherein the method is per- formed by a first terminal for transmitting or receiving the media data to or from a second terminal, the method comprising:

predicting an amount of the media data to be lost when the handover is performed;

generating control information for reducing the amount of the media data to be lost when the handover is performed by using the predicted amount of the media data to be lost when the handover is performed, wherein the control information includes information for expanding a size of a jitter buffer or for selecting a method to recover packets; and reducing the amount of the media data to be lost when the handover is performed by using the control information while the handover is performed.

2. The method of claim 1, further comprising:

transmitting the control information to the second terminal; and notifying the second terminal that the handover is to be performed by the first terminal.

3. The method of claim 1, wherein:

the predicting the amount of the media data to be lost when the handover is performed comprises predicting the amount of the media data to be lost when the handover is performed by using information about an amount of media data lost during a past handover.

4. The method of claim 3, wherein the predicting the amount of the media data to be lost when the handover is performed by using the information about the amount of the media data lost during the past handover comprises predicting at least one of an amount of packet loss, a jitter value, and a time skew value while the handover is performed.

5. The method of claim 4, wherein:

the predicting the amount of the media data to be lost when the handover is performed by using the information about the amount of the media data lost during the past handover comprises predicting the amount of the packet loss; and the reducing the amount of the media data to be lost when the handover is performed comprises:

selecting an algorithm for recovering the packet loss according to the predicted amount of the packet loss by using the control information; and recovering the packet loss by using the selected algorithm for recovering the packet loss.

6. The method of claim 4, wherein:

the predicting the amount of the media data to be lost when the handover is performed by using the information about the amount of the media data lost during the past handover comprises predicting the jitter value; and the reducing the amount of the media data to be lost when the handover is performed comprises expanding the size of the jitter buffer of the first terminal by using the control information.

7. The method of claim 3, further comprising, if the handover has been completed, storing the amount of the media data lost.

8. The method of claim 1, further comprising transmitting data for performing forward error correction on the media data to the second terminal while the handover is performed.

9. The method of claim 8, further comprising generating a channel for transmitting the data for performing the forward error correction when a connection is set up with the second terminal, wherein the transmitting the data for performing the forward error correction on the media data to the second terminal comprises transmitting the data for performing the forward error correction to the second terminal by using the generated channel.

10. The method of claim 8, further comprising, if the handover has been completed, notifying the second terminal that the handover has been completed.

11. A method of reducing an amount of media data to be lost when a handover is performed, wherein the method is performed by a first terminal for transmitting or receiving the media data to or from a second terminal, the method comprising:

receiving, from the second terminal, control information for reducing the amount of the media data to be lost when the handover is performed, wherein the control information includes information for expanding a size of a jitter buffer or for selecting a method to recover packets;

receiving notification, from the second terminal, that the handover is to be performed by the second terminal; and reducing the amount of the media data to be lost when the handover is performed by using the control information.

12. The method of claim 11, further comprising:

receiving, from the second terminal, notification that the handover has been completed; and terminating the reducing the amount of the media data to be lost when the handover is performed in response to the received notification.

13. The method of claim 11, wherein the control information is generated by predicting an amount of the media data to be lost when the handover is performed according to information about at least one of a predicted amount of packet loss, a predicted jitter value, and a predicted time skew value while the handover is performed.

14. The method of claim 13, wherein:

the control information is generated by predicting the amount of the media data to be lost when the handover is performed according to information about the predicted amount of the packet loss; and the reducing the amount of the media data to be lost when the handover is performed comprises:

selecting a predetermined algorithm for recovering the packet loss according to the predicted amount of the packet loss by using the control information; and recovering the packet loss by using the selected algorithm for recovering the packet loss.

15. The method of claim 13, wherein:

the control information is generated by predicting the amount of the media data to be lost when the handover is performed according to information about the predicted jitter value; and the reducing the amount of the media data to be lost when the handover is performed comprises expanding the size of the jitter buffer of the first terminal by using the control information.

16. The method of claim 11, further comprising:

receiving, from the second terminal, data for performing forward error correction on the media data; and performing the forward error correction on the media data by using the data for performing the forward error correction.

17. The method of claim 16, further comprising:

receiving, from the second terminal, notification that the handover has been completed; and terminating the performing the forward error correction on the media data in response to the received notification.

18. A first terminal for transmitting or receiving media data to or from a second terminal when a handover is performed, the first terminal comprising:

a communication unit which transmits or receives the media data to or from the second terminal;
a prediction data processing unit which predicts an amount of the media data to be lost when the handover is performed and which generates control information for reducing an amount of the media data to be lost when the handover is performed by using the predicted amount of the media data to be lost when the handover is performed, wherein the control information includes information for expanding a size of a jitter buffer or for selecting a method to recover packets; and
a controller which reduces the amount of the media data to be lost when the handover is performed by using the control information while the handover is performed.

19. The first terminal of claim 18, wherein the communication unit transmits the control information to the second terminal and notifies the second terminal that the handover is to be performed.

20. The first terminal of claim 18, wherein the prediction data processing unit comprises:
a loss data calculator which stores information about an amount of media data lost during a past handover;
a loss data predictor which linearly predicts the amount of the media data to be lost when the handover is performed by using the stored information about the amount of the media data lost during the past handover; and
a control information generator which generates the control information by using the linearly predicted amount of the media data to be lost when the handover is performed.

21. The first terminal of claim 20, wherein the linearly predicted amount of the media data to be lost when the handover is performed comprises information about at least one of a predicted amount of packet loss, a predicted jitter value, and a predicted time skew value while the handover is performed.

22. The first terminal of claim 21, wherein:
the linearly predicted amount of the media data to be lost when the handover is performed comprises the information about the predicted amount of the packet loss; and
the controller selects a predetermined algorithm for recovering the packet loss according to the predicted amount of the packet loss by using the control information and recovers the packet loss by using the selected algorithm for recovering the packet loss.

23. The first terminal of claim 21, wherein:
the linearly predicted amount of the media data to be lost when the handover is performed comprises the information about the predicted jitter value; and
the controller expands the size of the jitter buffer of the first terminal by using the control information.

24. The first terminal of claim 20, wherein, if the handover has been completed, the prediction data processing unit stores the amount of the media data lost during the handover.

25. The first terminal of claim 18, wherein the communication unit transmits data for performing forward error correction on the media data to the second terminal while the handover is performed.

26. The first terminal of claim 25, wherein, if the handover has been completed, the communication unit notifies the second terminal that the handover has been completed.

27. A first terminal for transmitting or receiving media data to or from a second terminal when a handover is performed, the first terminal comprising:
a communication unit which transmits or receives the media data to or from the second terminal, which receives, from the second terminal, control information that is generated by using a predicted amount of the media data to be lost when the handover is performed, and which receives notification, from the second terminal, that the handover is to be performed, wherein the control information includes information for expanding a size of a jitter buffer or for selecting a method to recover packets; and
a controller which reduces an amount of the media data to be lost when the handover is performed by using the control information.

28. The first terminal of claim 27, wherein, if the communication unit receives, from the second terminal, notification that the handover has been completed, the controller terminates the reducing the amount of the media data to be lost when the handover is performed.

29. The first terminal of claim 27, wherein the predicted amount of the media data to be lost when the handover is performed comprises information about at least one a predicted amount of packet loss, a predicted jitter value, and a predicted time skew value while the handover is performed.

30. The first terminal of claim 29, wherein:
the predicted amount of the media data to be lost when the handover is performed comprises information about the predicted amount of the packet loss; and
the controller selects a predetermined algorithm for recovering the packet loss according to the predicted amount of the packet loss by using the control information and recovers the packet loss by using the selected algorithm for recovering the packet loss.

31. The first terminal of claim 29, wherein
the predicted amount of the media data to be lost when the handover is performed comprises information about the predicted jitter value; and
the controller expands the size of the jitter buffer of the first terminal by using the control information.

32. The first terminal of claim 27, further comprising a forward error correction processing unit which performs forward error correction on the media data received from the second terminal,
wherein the communication unit receives, from the second terminal, data for performing the forward error correction on the media data, and the forward error correction processing unit performs the forward error correction on the media data by using the received data for performing the forward error correction.

33. The first terminal of claim 32, wherein, if the communication unit receives, from the second terminal, notification that the handover has been completed, the forward error correction processing unit terminates performing the forward error correction on the media data.

34. A non-transitory computer readable recording medium having recorded thereon a program for executing, by a first terminal transmitting or receiving meta data to or from a second terminal when a handover is performed, a method of reducing an amount of the media data to be lost when the handover is performed, wherein the method comprises:
predicting an amount of the media data to be lost when the handover is performed;
generating control information for reducing the amount of the media data to be lost when the handover is performed by using the predicted amount of the media data to be lost when the handover is performed, wherein the control information includes information for expanding a size of a jitter buffer or for selecting a method to recover packets; and reducing the amount of media data to be lost when the handover is performed by using the control information while the handover is performed.

35. A non-transitory computer readable recording medium having recorded thereon a program for executing, by a first terminal transmitting or receiving meta data to or form a second terminal when a handover is performed, a method of reducing an amount of the media data to be lost when the handover is performed, wherein the method comprises:
  receiving, from the second terminal, control information for reducing the amount of media data to be lost when the handover is performed, wherein the control information includes information for expanding a size of a jitter buffer or for selecting a method to recover packets;
  receiving notification, from the second terminal, that the handover is to be performed by the second terminal; and
  reducing the amount of the media data to be lost when the handover is performed by using the control information.

\* \* \* \* \*